United States Patent [19]

Bunn et al.

[11] 4,105,058
[45] Aug. 8, 1978

[54] SCREW LOCKING ARRANGEMENT

[75] Inventors: Stuart E. Bunn; Herbert B. Owsley, both of Shawnee Mission, Kans.

[73] Assignee: Ball Valve Company, Inc., Merriam, Kans.

[21] Appl. No.: 783,493

[22] Filed: Mar. 31, 1977

[51] Int. Cl.² ............................................. F16B 39/00
[52] U.S. Cl. ................................................. 151/41.74
[58] Field of Search .................. 151/41.74, 42, 54, 55, 151/57, 41.72, 2 A; 29/521, 522, 523

[56] References Cited

U.S. PATENT DOCUMENTS

| 442,642 | 12/1890 | Roby | 151/54 X |
|---|---|---|---|
| 1,196,565 | 8/1916 | McDonald | 151/42 |
| 1,865,866 | 7/1932 | Lee | 151/41.74 X |
| 1,892,119 | 12/1932 | Thompson | 151/2 A |
| 2,377,114 | 5/1945 | Tomalis | 151/42 X |
| 2,884,038 | 4/1959 | Overton | 151/41.74 X |

FOREIGN PATENT DOCUMENTS 8,662 of 1898 United Kingdom ...................... 151/42

Primary Examiner—Ramon S. Britts
Attorney, Agent, or Firm—Fishburn, Gold & Litman

[57] ABSTRACT

A screw locking arrangement comprises an article having a threaded aperture with an enlarged counterbore. A slot is positioned in the side wall of the counterbore and extends through the top surface of the article. A screw is threadedly engaged in the aperture and includes an enlarged head with a slot disposed in the outer marginal surface thereof. A deformable lock member is positioned in the counterbore and has a wall between the counterbore side wall and the marginal surface of the screwhead, and the wall is bent by a suitable tool into both of the slots, thereby positively locking the screw and the article together without indexing the same.

1 Claim, 6 Drawing Figures

SCREW LOCKING ARRANGEMENT

This invention relates to locking devices for screw threaded fastenings, and in particular to a locking arrangement for countersunk screws.

The principal objects of the present invention are: to provide a screw locking arrangement which positively connects a screw with an article and prevents relative rotation there-between; to provide such an arrangement having a deformable lock member whereby said article and said screw need not be indexed to achieve locking; to provide such an arrangement for screws having countersunk heads; to provide such an arrangement wherein said screw and said article each have at least one slot adaptable for receiving a portion of said deformable lock member therein, and said arrangement includes a suitably shaped tool for bending said lock member; to provide such an arrangement wherein said deformable lock washer includes an apertured based positioned between the bottom surfaces of the screwhead and article aperture respectively, and retains the same within the slots; to provide such an arrangement having a plurality of slots, the number of slots being selected in accordance with the degree of interlocking desired; and to provide such an arrangement which is economical to manufacture, efficient in use, capable of long operating life, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include exemplary embodiments of the present invention and illustrate various objects and features thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
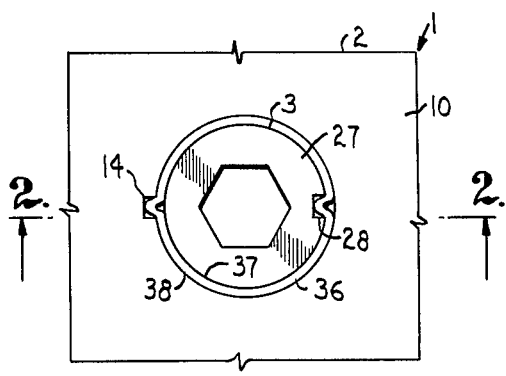
FIG. 1 is a fragmentary top plan view of a screw locking arrangement embodying the present invention.
Figure 2:
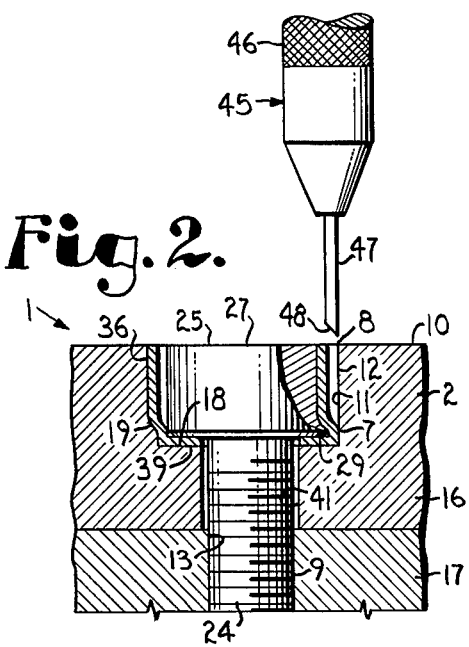
FIG. 2 is a vertical cross-sectional view of the screw locking arrangement shown in FIG. 1, and includes a fragmentary illustration of a tool for locking the arrangement.
Figure 3:
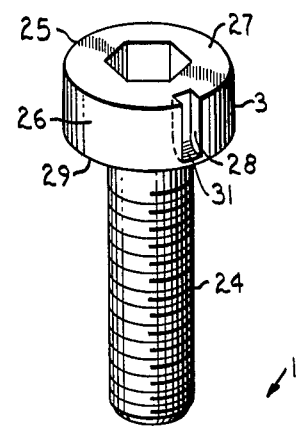
FIG. 3 is an exploded perspective view of the screw locking arrangement of FIG. 1.
Figure 3:
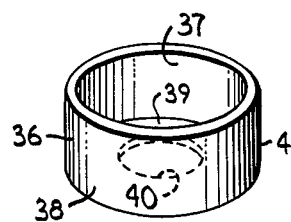
Figure 3:
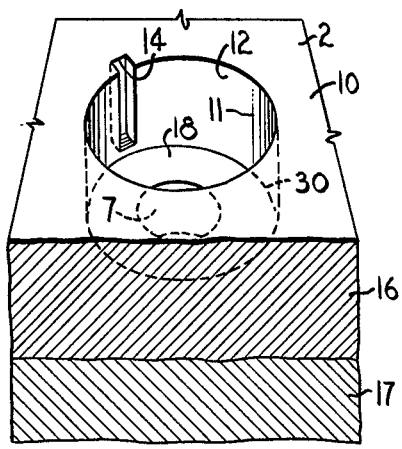

The reference numeral 1 generally designates a screw locking arrangement embodying the present invention, comprising an apertured article or structure 2, a screw 3, and a lock member 4. The article or structure 2 has an aperture 7 therein with first and second ends 8 and 9 respectively, and an outer surface 10. In the attitude illustrated in FIGS. 1-3, the aperture ends 8 and 9 are disposed upwardly and downwardly respectively. The upper end 8 of the aperture 7 includes an enlarged counterbore 11 defined by a side wall 12, and the lower end 9 has an internally threaded side wall 13. At least one slot 14 is positioned in the aperture side wall 12 and extends through the top surface 10 of the structure. The article or structure 2 may comprise a one-piece arrangement for use as a set screw arrangement, and in the illustrated structure, includes a pair of mating structural members such as plates 16 and 17 wherein the counterbore 11 is disposed wholly within the upper plate 16 and the aperture second end is disposed wholly within the lower plate 17, whereby the screw 3 separably fastens the two plate members together. In this example, one slot is provided, and the slot 14 has a substantially uniform, rectangular, transverse cross-sectional shape and extends from the top surface 10 downwardly adjacent to the bottom surface 18 of the counterbore 11 along a line substantially parallel with the central axis of the aperture 7. The illustrated slot 14 also has an arcuately shaped base 19 and is adapted to receive a suitable tool therein for effecting locking action with the lock member 4 as later described.

The screw 3 has a threaded shank 24 and a head 25 with an outer marginal surface 26, and a top surface 27. The screw shank 24 is threadedly engaged in the article side wall 13, and the head 25 is positioned within the counterbore 11. The head 25 includes at least one slot 28 positioned in the marginal surface 26 thereof which extends through the top surface 27. The illustrated screw 3 is a socket type machine screw having an enlarged cylindrically shaped head with an octagonal recess disposed centrally therein for engagement with an allen wrench. The enlarged head 25 forms a load bearing shoulder 29, which is disposed adjacent to an annular seat portion 30 of the article aperture 7 during a fastening position. The illustrated arrangement includes one slot, wherein the slot 28 has a substantially uniform, rectangular, transverse cross-sectional shape, and extends through the top surface 27 downwardly adjacent to the shoulder 29 along a line substantially parallel with the central axis of the head and shank members 24 and 25 respectively. The slot 28 also includes an arcuately shaped base 31 and is adapted to receive therein a suitably shaped tool for effecting locking action with the lock member 4 as later described.

The lock member 4 is positioned in the counterbore 11 and has a wall 36 between the side wall 12 of the article aperture 7 and the marginal surface 26 of the screwhead 25, and is shaped in the nature of a washer, collar, or the like. The lock member wall 36 is deformable, and is, during a locked position, bent outwardly into the article slot 14 and inwardly into the screwhead slot 28, thereby positively connecting the screw 3 and the article 2 and preventing relative rotation therebetween. The lock member 4 may be constructed of any suitable material, including plastic, or metal such as aluminum, mild steel, and the like, and preferably is elastic and repeatedly deformable. The illustrated lock member side wall 36 has inside and outside surfaces 37 and 38. The side wall surfaces 37 and 38 are disposed adjacent or abutting the screwhead marginal surface 26 and the counterbore side wall 12 respectively, for secure engagement with the slots and a strong lock. A base 39 is attached to the side wall 36 and includes an aperture 40 disposed centrally therethrough which is aligned and mates with the article aperture lower end 9. The lock member base 39 is positioned between and abuts the bottom surfaces of the screwhead 25 and counterbore 11 and retains the lock member between the article side wall 12 and the screwhead marginal surface 26. The screwhead 25 is preferably drawn tightly against the lock member base 39, and frictionally secures the member to the article for secure locking of the screw.

Figure 4:
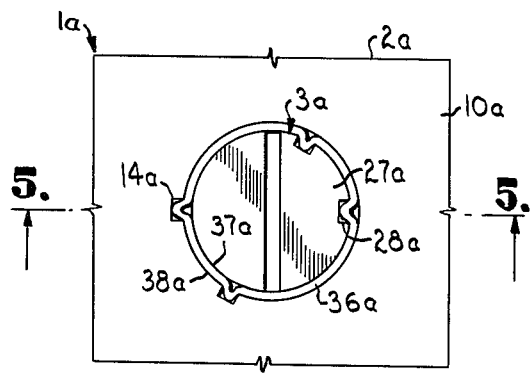
FIG. 4 is a top plan view of another embodiment of the screw locking arrangement, particularly adapted for bevelhead screws.
Figure 6:
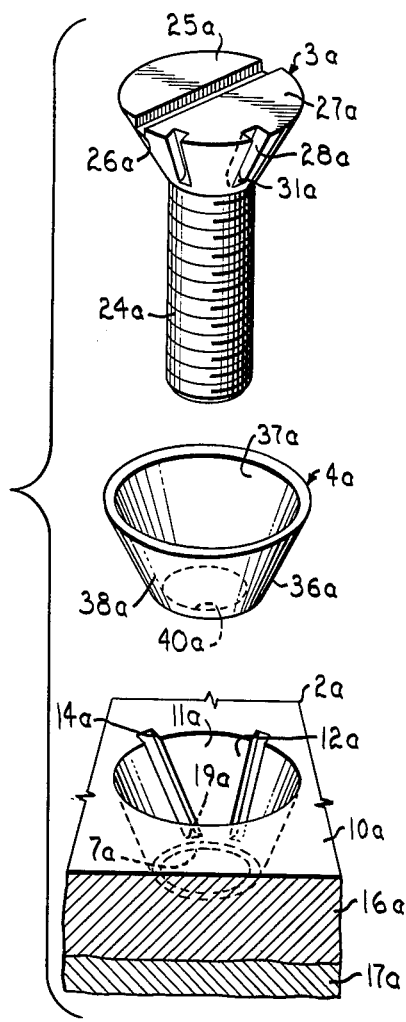
FIG. 6 is an exploded perspective view of the screw locking arrangement of FIG. 4.
Figure 5:
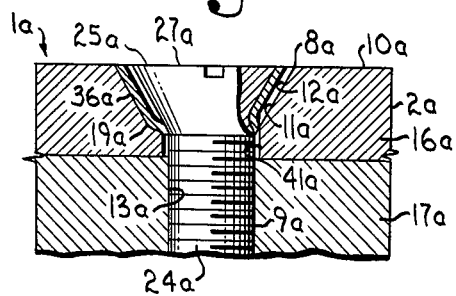
FIG. 5 is a vertical cross-sectional view of the screw locking arrangement shown in FIG. 4.

A second embodiment of the present invention is illustrated in FIGS. 4-6 and comprises a screw locking arrangement for a bevelhead screw 3a. The side wall 12a of the article, the lock member 4a, and the screwhead 25a, each have a frustroconical shape and abuttingly mate with each other. The screw locking arrangement may include a plurality of slots for increased interlocking security, and in this example, the article 2a and the screw 3a each have two slots therein. Since the construction and use of the embodiment illustrated in FIGS. 4-6 is substantially the same as that illustrated in FIGS. 1-3, and previously described, the same numbers are used for the same parts in FIGS. 1-3 and 4-6 respectively, except for the addition of the suffix "a" appended to the numbers of the latter.

In use, the screw locking arrangement can be used for retaining a set screw, or as illustrated in FIGS. 1-6 may be provided to retain a screw 3 for threadedly connecting a pair of separate structural members 16 and 17. The lower plate 17 is drilled and tapped with a thread for receiving the bolt shank 24 therein, and the article is provided with an aligned aperture 41 having an inside diameter slightly greater than that of the bolt shank 24, and includes the enlarged counterbore 11. The slot 14 is then installed in the side wall of the counterbore 11 and the deformable lock member 4 is telescopically inserted into the counterbore, fitting snugly therein, with base 39 abutting the bottom surface 18. The bolt is disposed coaxially with the lock member and aperture, and is inserted through the first structural member aperture 41 and threadedly engaged with the side wall of the second structural member 17. The screw 2 is rotated until the shoulder 29 of the head 25 abuts the upper surface of the washer base 39 and is drawn snugly thereagainst. In this example, the depth of the washer side wall 36 is substantially coextensive with the depth of the counterbore 11 and bolt head 25, whereby the top surface of each is substantially coplanar. A suitably shaped tool, such as a wedge shaped tool 45, having one end 46 thereof adapted for grasping by the user and the other end 47 thereof with an inclined leading edge 48, is provided to bend the lock member wall 36 inwardly into the screwhead slot 28 and outwardly into the article slot 14. It is to be understood that the present invention contemplates the use of any suitably shaped tool compatible with the slot shape and lock washer material, and may include a heated tip for molding a plastic lock member. To bend the lock member wall into the screwhead slot 28, the leading edge 48 of the tool 45 is wedged between the side wall 12 of the counterbore and the outside surface of the lock member side wall 36. The tool is then driven downwardly by means such as a hammer, impacting tool, or the like, until the leading edge is disposed adjacent to the base 31 of the slot 28. The side wall 36 of the lock member is thereby deformed inwardly into the head slot 28 and forms an elongate, projecting rib which positively interconnects the washer with the screw. The illustrated tool has a shaped edge which conforms with slot base 31 to bend the lock member side wall therein. In a similar manner, the lock member is deformed outwardly into article slot 14 which positively interconnects the article and the lock member, thereby preventing relative rotation between the bolt and the article. If the arrangement includes a plurality of slots the lock member is bent successively into each slot. The screw locking arrangement may be disengaged by employing a second wedge shaped tool (not shown) having opposed sides thereof mating with the slots and the deformed portion of the lock member side wall respectively, to bend the lock member side wall back into its original, substantially arcuate shape. Although the slots 14 and 28 are illustrated as being diametrically opposed, the article 2 and screw 3 need not be indexed or positioned relative to one another to accomplish the locking, and may assume substantially any orientation with respect to each other. In the unlikely event that after the screw has been tightened, the article and bolt head slots 14 and 21 are in perfect alignment, the bolt is simply rotated a small amount by slightly tightening or loosening the same before the lock member is deformed.

It is to be understood that while we have illustrated and described certain forms of our invention, it is not to be limited to the specific forms or arrangement of parts herein described and shown.

What we claim and desire to secure by Letters Patent is:

1. A screw locking arrangement comprising:
   (a) an article having a top surface, and an aperture therein with first and second portions; said aperture first portion including an enlarged counterbore defined by a first side wall, and said aperture second portion having an internally threaded second side wall; said first side wall including an open slot therein, said open slot being substantially coplanar with the axis of the aperture and extending from adjacent an inner end of the counterbore through said article top surface;
   (b) a screw having a threaded shank and a head with an outer marginal surface and a top surface; said shank being threadedly engaged in said article second side wall, and said head being positioned within said counterbore; said screwhead including an open slot positioned in the marginal surface thereof; said open slot in the screwhead being substantially coplanar with the axis of the screw and extending from adjacent the inner end of the screwhead through said screwhead top surface, said screwhead slot and said article slot being substantially uniform and rectangular in transverse cross-sectional shape; and
   (c) a lock member having a wall with a central aperture through which the screw shank extends, said wall being positioned between the first side wall of said article counterbore and the marginal surface of said screwhead and clamped therebetween with the screw tightened in place; said clamped lock member wall being deformable and bent outwardly into said article slot and inwardly into said screwhead slot thereby positively connecting said screw and said article without indexing the same, and preventing relative rotation therebetween.

* * * * *